(12) United States Patent
Sawada

(10) Patent No.: US 6,486,979 B1
(45) Date of Patent: Nov. 26, 2002

(54) IMAGE SENSOR CHIP AND IMAGE READING DEVICE PROVIDED WITH IT

(75) Inventor: Hideki Sawada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/402,701

(22) PCT Filed: Jan. 28, 1999

(86) PCT No.: PCT/JP99/00373

§ 371 (c)(1),
(2), (4) Date: Sep. 29, 1999

(87) PCT Pub. No.: WO99/39502

PCT Pub. Date: Aug. 5, 1999

(51) Int. Cl.[7] ................................................. H04N 1/04
(52) U.S. Cl. ..................................................... 358/483
(58) Field of Search ................................. 358/483, 482, 358/514, 513, 512, 474, 497, 496, 473, 472; 382/312, 313

(56) References Cited

U.S. PATENT DOCUMENTS

| | | | | |
|---|---|---|---|---|
| 5,031,032 A | * | 7/1991 | Perregaux et al. | 358/514 |
| 5,091,978 A | * | 2/1992 | Hirota | 382/162 |
| 5,587,814 A | * | 12/1996 | Mihara et al. | 358/512 |
| 5,619,345 A | * | 4/1997 | Machida et al. | 358/482 |
| 5,650,864 A | * | 7/1997 | Tseng et al. | 358/475 |
| 6,025,935 A | * | 2/2000 | Tseng | 358/483 |
| 6,195,183 B1 | * | 2/2001 | Fujimoto et al. | 358/514 |
| 6,266,438 B1 | * | 7/2001 | Metcalfe et al. | 382/162 |
| 6,376,822 B1 | * | 4/2002 | Fujimoto et al. | 250/208.1 |
| 6,381,378 B1 | * | 4/2002 | Tanaka et al. | 382/312 |

FOREIGN PATENT DOCUMENTS

| | | |
|---|---|---|
| JP | 63250963 | 10/1988 |
| JP | 04083462 | 3/1992 |
| JP | 05292256 | 11/1993 |

OTHER PUBLICATIONS

Form PCT/IB/304.
Form PCT/IB/308.

* cited by examiner

*Primary Examiner*—Cheukfan Lee
(74) *Attorney, Agent, or Firm*—Merchant & Gould P.C.

(57) ABSTRACT

In an image sensor chip (A), the number N of the image reading picture elements is defined as N=n·k (other than an integer multiple of 16). The n represents the number of image signals processed as a group when the image signals from the light receiving elements are subjected to level correction on a group-by-group basis. The k is the minimum: integer satisfying $0<(n\cdot k-g\cdot p)<n$. The g is the resolution defined as the number of image reading picture elements per predetermined unit length. The p is the minimum difference between required different reading widths as calculated on the basis of said unit length. When a plurality of such image sensor chips (A) are arranged in an array, the excess ratio of the array length of the image sensor chips (A) relative to a required reading width can be rendered constant.

6 Claims, 2 Drawing Sheets

IMAGE SENSOR CHIP AND IMAGE READING DEVICE PROVIDED WITH IT

FIELD OF THE INVENTION

The present invention relates to an image sensor chip for use as a component of an image reading apparatus. It also relates to an image reading apparatus employing such an image sensor chip.

BACKGROUND OF THE INVENTION

An image sensor chip is known which is elongated in a direction and which has a surface portion integrally incorporating a plurality of light receiving elements for photoelectric conversion. Each of the light receiving elements has a light receiving surface for receiving light and for generating an image signal with an output level corresponding to the received amount of light. The respective light receiving surfaces serve as the picture elements of the image sensor chip and are arranged in a row at a constant pitch longitudinally of the image sensor chip.

The length of such an image sensor chip ranges from several millimeters to less than 20 millimeters, so that a single image sensor chip fails to read a document which is wider than it. Therefore, in actual use of the image sensor chip as a component of an image reading apparatus, a plurality of such image sensor chips are arranged in an array.

When using a plurality of image sensor chips in this way, they may suffer fluctuations in the output level of their image signals due to manufacturing errors of the image sensor chips and positional deviations relative to the lens of the image reading apparatus even if the light receiving elements receive an equal amount of light. Accordingly, image reading is performed by a plurality of image sensor chips, the image signals outputted from the plurality of light receiving elements are subjected to level correction to prevent unevenness in the output level. In this regard, if the level correction is performed individually for all signals from the light receiving elements, the process will be very cumbersome. Therefore, as a simple way to perform the level correction, the correction is performed collectively for each group of e.g. eight light receiving elements, wherein the image signal outputted from one of the eight light receiving elements in the group is used as the basis for the correction.

On the other hand, the number of the light receiving elements incorporated in a prior art image sensor chip is, for example, 32, 64 or 128 which is an integer multiple of 16. This is convenient for the above-described level correction because the light receiving elements of the image sensor chip can be exactly divided into plural groups of eight elements without any excess.

However, the prior art image sensor chip still has the following problems.

For image reading of a document by using an array of image sensor chips, the image sensor chip array is required to provide an image reading width (substantially equal to the combined length of the image sensor chips in the array) which is greater by an suitable excess than the document width. If the image reading width is excessively greater than the document width, the image sensor chips may be partially wasted, and the image reading apparatus becomes unnecessarily large. Conversely, if the excess of the image reading width is too small, the image sensor chip array may fails to read a side part of the document even due to a slight deviation of the document positioning. Here, in order for the above-described excess to be suitable, it should be relatively smaller for a narrower document but relatively larger for a wider document. This is because, in reading a narrow document accurately, the document is unlikely to positionally deviate too much in the primary scanning direction (or in the direction of the row of the image reading picture elements), whereas, in reading a wide document, the document is likely to positionally deviate in the primary scanning direction to a large extent.

However, the prior art image sensor chip is incapable of meeting the requirements. Taking an image sensor chip of 10.84 mm in length with a resolution of 11.8 dots/mm as an example, it has 128 image reading picture elements. In order for such an image sensor chip to meet a variety of reading width requirements, the specifications shown in Table 1 below are called for.

TABLE 1

| Required Reading Width S (mm) | Number of Required Chips | Chip Array Length La (mm) | Excess Lb (mm) | Excess Ratio R (%) |
|---|---|---|---|---|
| 25.4 (1 inch) | 3 | 32.52 | 7.12 | 28.05 |
| 50.8 (2 inch) | 5 | 54.21 | 3.41 | 6.71 |
| 76.2 (3 inch) | 8 | 86.73 | 10.53 | 13.82 |
| 101.6 (4 inch) | 10 | 108.42 | 6.82 | 6.71 |
| 127 (5 inch) | 12 | 130.10 | 3.10 | 2.44 |
| 152.4 (6 inch) | 14 | 162.62 | 10.22 | 6.71 |
| 177.8 (7 inch) | 17 | 184.31 | 6.51 | 3.66 |
| 203.2 (8 inch) | 19 | 205.99 | 2.79 | 1.37 |
| 215.9 (8.5 inch) | 20 | 216.83 | 0.93 | 0.43 |
| 254 (10 inch) | 24 | 260.20 | 6.20 | 2.44 |

Taking an image sensor chip of 8 mm in length with a resolution of 8 dots/mm as another example, it has 64 image reading picture elements. In order for such an image sensor chip to meet various reading width requirements, the specifications shown in Table 2 below are called for.

TABLE 2

| Required Reading Width S (mm) | Number of Required Chips | Chip Array Length La (mm) | Excess Lb (mm) | Excess Ratio R (%) |
|---|---|---|---|---|
| 25.4 (1 inch) | 4 | 32.00 | 6.60 | 25.98 |
| 50.8 (2 inch) | 7 | 56.00 | 5.20 | 10.24 |
| 76.2 (3 inch) | 10 | 80.00 | 3.80 | 4.99 |
| 101.6 (4 inch) | 13 | 104.00 | 2.40 | 2.36 |
| 127 (5 inch) | 16 | 128.00 | 1.00 | 0.79 |
| 152.4 (6 inch) | 20 | 160.00 | 7.60 | 4.99 |
| 177.8 (7 inch) | 23 | 184.00 | 6.20 | 3.49 |
| 203.2 (8 inch) | 26 | 208.00 | 4.80 | 2.36 |
| 215.9 (8.5 inch) | 27 | 216.00 | 0.10 | 0.05 |
| 254 (10 inch) | 32 | 256.00 | 2.00 | 0.79 |

As appreciated from Tables 1 and 2, when using a given number of conventional image sensor chips in an array for meeting the required reading width S, the excess Lb of the chip array length which is the difference between the required reading width S and the chip array length La becomes smaller as the required reading width S increases. Similarly, the excess ratio (R=Lb/S) also becomes gradually smaller. In this way, the use of the conventional image sensor chips directly contradicts the above-mentioned requirements, making it difficult to suitably adjust the excess Lb to the required reading width S. As a result, if an attempt is made to use a minimum number of conventional image sensor chips for saving, even a slight deviation of the document may cause difficulty in performing appropriate image reading due to an unduly small excess Lb. Further, the use of an excessive number of image sensor chips for overcoming such a problem will result in added cost while causing a size increase of the image reading apparatus as a whole.

SUMMARY OF THE INVENTION

It is therefore an object of the present invention to provide an image sensor chip which is capable of eliminating or alleviating the problems described above.

It is another object of the present invention to provide an image reading apparatus employing such a image sensor chip.

According to a first aspect of the present invention, there is provided an image sensor chip comprising: a plurality of light receiving elements for photoelectric conversion, the plurality of light receiving elements having light receiving surfaces serving as a plurality of image reading picture elements, the plurality of image reading picture elements being arranged in a row at a constant pitch on the chip; wherein the number N of the image reading picture elements is defined as N=n·k (other than an integer multiple of 16); wherein n represents the number of image signals processed as a group when the image signals from the light receiving elements are subjected to level correction on a group-by-group basis; wherein k is a minimum integer satisfying $0<(n·k-\gamma·p)<n$; wherein $\gamma$ is a resolution defined as the number of image reading picture elements per predetermined unit length; and wherein p is a minimum difference between required reading widths as calculated on the basis of said unit length.

Preferably, the chip comprises a semiconductor chip which as a rectangular shape elongated in a direction, and the plurality of light receiving elements are built in the chip as arranged in said direction.

Preferably, the image sensor chip further comprises a built-in circuit for operating the plurality of light receiving elements.

Preferably, n is 8, $\gamma$ is 11.8 dots/mm, and the number N of the reading picture elements is 152.

Preferably, n is 8, $\gamma$ is 8 dots/mm, and the number N of the image reading picture elements is 104.

According to a second aspect of the present invention, there is provided an image reading apparatus comprising: a plurality of image sensor chips carrying a plurality of light receiving elements for photoelectric conversion, the plurality of light receiving elements having light receiving surfaces serving as a plurality of image reading picture elements, the plurality of image reading picture elements being arranged in a row at a constant pitch on the chip; a substrate carrying thereon the plurality of image sensor chips arranged in an array; a light source for irradiating a reading line area of a document image with light; a lens for focusing the light, which is irradiated by the light source and reflected from the document, at the plurality of image reading picture elements; wherein the number N of the image reading picture elements is defined as N=n·k (other than an integer multiple of 16); wherein n represents the number of image signals processed as a group when the image signals from the light receiving elements are subjected to level correction on a group-by-group basis; wherein k is a minimum integer satisfying $0<(n·k-\gamma·p)<n$; wherein $\gamma$ is a resolution defined as the number of image reading picture elements per predetermined unit length; wherein p is a minimum difference between required reading widths as calculated on the basis of said unit length.

As the number N of the image reading picture elements satisfies the condition described above, the present invention has following advantages.

Firstly, when arranging a plurality of image sensor chips in an array for providing any one of the required reading widths which is an integer multiple of p, it is only necessary to use only a minimum number of image sensor chips whichever reading width is selected, whereby the excess of the image sensor chip array relative to the actual reading width can be kept at a constant ratio relative to the selected reading width. Therefore, the present invention allows the excess of the image sensor chip array to be smaller for a narrower document but larger for a wider document. Consequently, according to the present invention as opposed to the prior art, when using a plurality of image sensor chips in an array for providing a desired reading width, it is possible to reduce a waste with respect to the number and length of the image sensor chips, thereby reducing the cost while realizing a size reduction of the image reading apparatus incorporating such image sensor chips. Further, since the reading width of the image sensor chip array still has a reasonable excess, it is possible to avoid an image reading difficulty which may be caused due to a positional deviation of the document deviation.

Secondly, the number N of the image reading picture elements is an integer multiple of the number of the image signals processed together in a single group for group-by-group level correction, the plurality of image signals outputted from each image sensor chip can be divided into a plurality of groups without any remainder for the level correction. Therefore, according to the present invention, the plurality of image signals outputted separately from two image sensor chips need not be grouped together for correction even though the plurality of image sensor chips are arranged in an array. Thus, it is possible to avoid the disadvantage previously encountered with the prior in level correction.

Other features and advantages of the present invention will become apparent from the detailed description given below with reference to the accompanying drawings.

DETAILED DESCRIPTION OF THE PREFERRED EMBODIMENT

The preferred embodiment of the present invention will be specifically described below with reference to the accompanying drawings.

Figure 1:
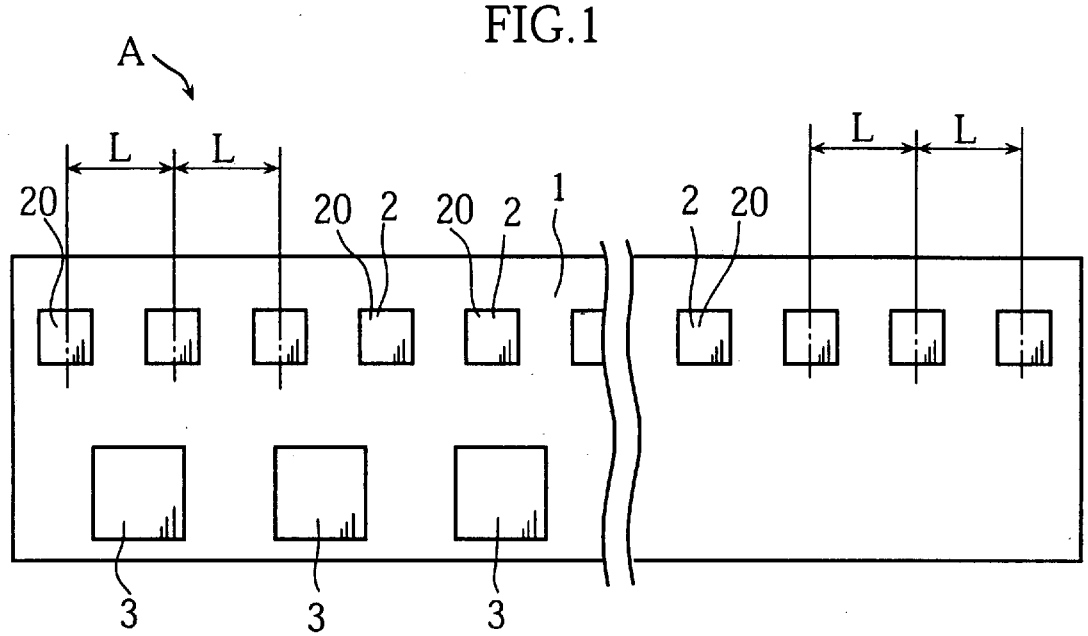
FIG. 1 is a plan view of an image sensor chip embodying the present invention.

FIG. 1 shows an image sensor chip A which is an elongated rectangular semiconductor chip. The chip includes, for example, a thin silicon substrate 1 formed integrally with an N number (described hereinafter) of light receiving elements 2 and a circuit for operating the light receiving elements 2. Each of the light receiving elements 2 comprises a phototransistor for photoelectric conversion and has a rectangular or square light receiving surface 20, respectively. The light receiving surfaces 20 serve as image reading picture elements as arranged in a row at a constant pitch L longitudinally of the substrate lover the entire length thereof. The surface of the image sensor chip A is covered with an insulating protective coating (not shown). However, the protective coating has a plurality of windows corresponding in size and arrangement to the light receiving surfaces 20. Each of the light receiving surfaces 20 receives light through the respective window. The surface of the protective coating is provided a plurality of pads 3 for electrically connecting the built-in circuit of the image sensor chip A with the exterior.

Figure 2:
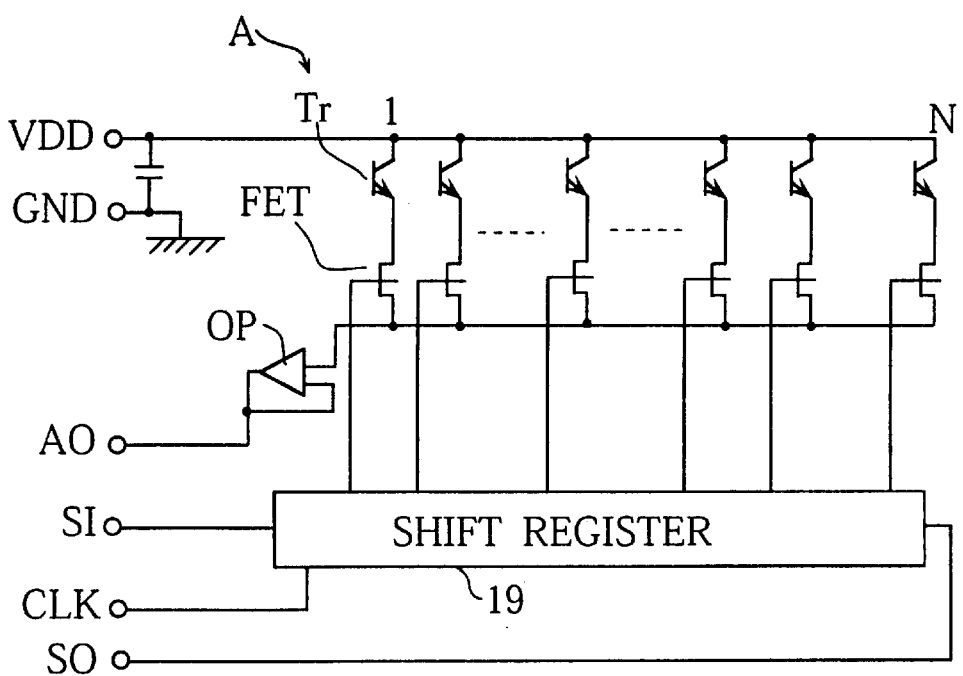
FIG. 2 is a circuit block diagram schematically illustrating a circuit arrangement of the image sensor chip shown in FIG. 1.

FIG. 2 illustrates a circuit arrangement of the image sensor chip A. The image sensor chip A comprises phototransistors Tr providing an N number of light receiving elements 2, an FET connected to the emitter of each phototransistor Tr, an amplifier OP for amplifying the current from the respective EFT, a N-bit shift register 19, a pad VDD, a pad GND, a pad AO, a pad SI, a pad CLK, and a pad SO. These pads are divisionally located at a plurality of pad arranging portions 3. The pad VDD is provided with a power supply of 5 volts for example. The pad GND is connected to a grounding line. The pad CLK is fed with clock signals of e.g. 8 MHz. The pad SI receives serial input signals. The pad AO provides serial output of analog image signals each corresponding to the amount of light received by the respective phototransistor Tr. The pad SO provides serial output signals.

With such a circuit arrangement, when serial-in signals are supplied to the pad SI, the shift register 19 turns on the N number of FETs successively. Then, the electrical charge stored in the N number of phototransistors Tr is released successively for serial output through the pad AO after amplification at the amplifier OP. When the image signal from the final Nth phototransistor Tr is outputted by operation of the shift register 19, a serial-out signal is supplied through the pad SO. The image sensor chip A is designed to repeat such a series of operations.

Next, description is made with respect to the number N of the image reading picture elements of the image sensor chip A.

The number N of the image reading picture elements is defined as $N=n \cdot k$, where the n represents the number of the image signals processed in a group when the image signals from the light receiving elements 2 are subjected to level correction on a group-by-group basis. The value of the n is "8" for example, as is conventionally the case.

The k is a minimum integer satisfying $0<(n \cdot k-\gamma \cdot p)<n$. The $\gamma$ is a resolution defined as the number of image reading picture elements per predetermined unit length. If the pitch L between the light receiving surfaces is approximately 0.085 mm for example, the resolution $\gamma$ is 11.8 dots/mm. If an inch is taken as a unit length, the resolution $\gamma$ is 300 dpi (dpi being the abbreviation for dot/inch). The p is the minimum difference between required reading widths. Specifically, the minimum difference p is the value which is determined according to the customer's requests or the type of the image reader made by the manufacturer. Where a plurality of image sensor chips A are used to provide various reading widths, the smallest one of the differences between the various reading widths is the minimum difference referred to here. For example, as shown in Table 3 below, if the image sensor chips A are required to provide the reading widths S of 25.4 mm (1 inch), 50.8 mm (2 inch), 76.2 mm (3 inch) . . . 203.2 mm (8 inch), 215.9 mm (8.5 inch), 254 mm (10 inch), the minimum difference p is 12.7 mm (½ inch). This minimum difference p is, however, calculated on the basis of the unit length (1 inch) used for the resolution $\gamma$, i.e., ½ inches in this case.

Under the above condition, $\gamma \cdot p = 300 \times (½) = 150$. The value of $\gamma \cdot p$ corresponds to the number of the image reading picture elements needed for reading the minimum difference p between the required reading widths. The value of the k as the minimum integer satisfying $0<(n \cdot k-\gamma \cdot p)<n$ is $k=19$ for $n=8$ and $D=150$. Accordingly, the substitution of 19 for k in $N=n \cdot k$ described above gives $N=152$. Thus, 152 light receiving elements 2 are integrated in the image sensor chip A, or the number N of the image reading picture elements is 152. As a result, the length of the image sensor chip A is approximately 12.874 mm.

Next, description is made as to the use and advantages of the image sensor chip A.

Figure 3:
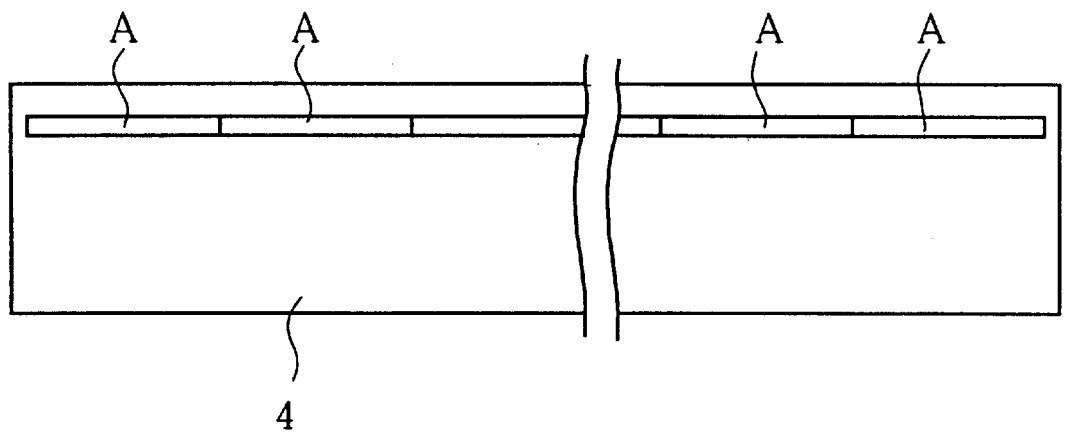
FIG. 3 is a schematic plan view showing a circuit board which is provided with the image sensor chip shown in FIG. 1.

As shown in FIG. 3, a plurality of image sensor chips A are prepared and mounted in an array on a surface of a circuit board 4. The surface of the circuit board 4 is formed with a wiring pattern (not shown) for electrically connecting to the pads 3 of the plural image sensor chips A. The pads 3 of the plural image sensor chips A are connected to the wiring pattern via gold wires (not shown) in a manner such that the plural image sensor chips A are electrically connected to each other in series. On the other hand, the number of the image sensor chips A mounted on the circuit board 4 is optionally selected according to the reading width required for a target image reader to which the image sensors are incorporated. The concrete specifications are given in Table 3.

TABLE 3

| Required Reading Width S (mm) | Number of Required Chips | Chip Array Length La (mm) | Excess Lb (mm) | Excess Ratio R (%) |
|---|---|---|---|---|
| 25.4 (1 inch) | 2 | 25.75 | 0.35 | 1.37 |
| 50.8 (2 inch) | 4 | 51.50 | 0.70 | 1.37 |
| 76.2 (3 inch) | 6 | 77.25 | 1.05 | 1.37 |
| 101.6 (4 inch) | 8 | 103.00 | 1.40 | 1.37 |
| 127 (5 inch) | 10 | 128.74 | 1.74 | 1.37 |
| 152.4 (6 inch) | 12 | 154.49 | 2.09 | 1.37 |
| 177.8 (7 inch) | 14 | 180.24 | 2.44 | 1.37 |
| 203.2 (8 inch) | 16 | 205.99 | 2.79 | 1.37 |
| 215.9 (8.5 inch) | 17 | 218.86 | 2.96 | 1.37 |
| 254 (10 inch) | 20 | 257.49 | 3.49 | 1.37 |

As appreciated from Table 3, for a required reading width S of 25.4 mm (1 inch) for example, only two image sensor chips are needed, thereby providing an array length La of approximately 25.75 mm for the two image sensor chips A. An excess Lb of the image sensor chip array length La over the required reading width S is approximately 0.35 mm, resulting in an excess ratio R of approximately 1.37%. By contrast, as the required reading width S increases to 50.8 mm and 76.2 mm, respectively, by increments of 25.4 mm (1 inch), the excess Lb of the image sensor chip array length La over the required reading width S also increases gradually, but the excess ratio R still remains at approximately 1.37% as in the case for the required reading width S of 25.4 mm. Further, even if the required reading width S changes by increments of 12.7 mm (½ inch) to e.g. 215.9 mm, the excess ratio R still remains at approximately 1.37%.

As described above, when a plurality of image sensor chips A are used for meeting the requirement of reading width S, it is possible to always keep the excess ratio R constant for any required width S by using only a minimum number of image sensor chips A needed for exceeding the required reading width S. Accordingly, wasteful use of image sensor chips A may be avoided. Given a constant excess ratio R, the excess Lb is smaller for a smaller required reading width S, consequently reducing the useless area in the array of the image sensor chips A. Conversely, the excess Lb is larger for a lager reading width S, so that the whole image on the document can be scanned appropriately even if the document to be read positionally deviates slightly in the primary scanning direction.

As opposed to the above example of conditions, if the resolution γ is changed to 203 dpi (8 dots/mm) for example with the values of n and p maintained n=8 and p=½ inch (12.7 mm), respectively, the number N of the image reading picture elements in the image sensor chip A is calculated as N=8×13=104 because of γ·p=101.5 and k=13. In this case, the length of a single chip is 13 mm. The specifications for such image sensor chips to meet various reading width requirements is given in Table 4 below.

TABLE 4

| Required Reading Width S (mm) | Number of Required Chips | Chip Array Length La (mm) | Excess Lb (mm) | Excess Ratio R (%) |
|---|---|---|---|---|
| 25.4 (1 inch) | 2 | 26.00 | 0.60 | 2.36 |
| 50.8 (2 inch) | 4 | 52.00 | 1.20 | 2.36 |
| 76.2 (3 inch) | 6 | 78.00 | 1.80 | 2.36 |
| 101.6 (4 inch) | 8 | 104.00 | 2.40 | 2.36 |
| 127 (5 inch) | 10 | 130.00 | 3.00 | 2.36 |
| 152.4 (6 inch) | 12 | 156.00 | 3.60 | 2.36 |
| 177.8 (7 inch) | 14 | 182.00 | 4.20 | 2.36 |
| 203.2 (8 inch) | 16 | 208.00 | 4.80 | 2.36 |
| 215.9 (8.5 inch) | 17 | 221.00 | 5.10 | 2.36 |
| 254 (10 inch) | 20 | 260.00 | 6.00 | 2.36 |

As appreciated from Table 4, the ratio R of the excess Lb of the image sensor chip array can also be maintained at a constant value of approximately 2.36% if the required reading width S is an integer multiple of the minimum difference p (p=½ inch) between the required different reading widths. Therefore, the excess Lb is smaller for a smaller required reading width S but becomes gradually larger as the required reading width S increases.

Next, description is made with respect to the structure of an image reading apparatus employing such image sensor chips A.

Figure 4:
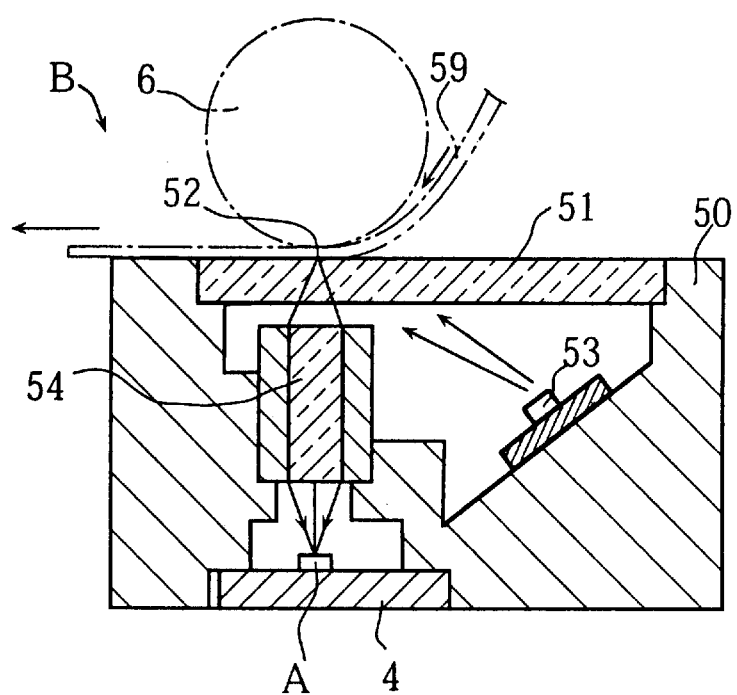
FIG. 4 is a schematic sectional view showing an example of image reading apparatus employing the image sensor chip shown in FIG. 1.

FIG. 4 shows an image reading apparatus B which is basically identical in structure to a known image reader. The image reader B includes a case 50 provided with a transparent board 51. A predetermined line area on a surface of the transparent board 51 serves as an image reading area 52. A platen roller 6 is provided in opposite to the image reading area 52 for transferring a document 59 in the secondary scanning direction. The case 50 is internally provided with a light source 53 such as LEDs for irradiating the image reading area 52 with light, and a lens 54 is disposed right below the image reading area 52 for condensing the light. The lens 54 may comprise an array of self-focusing lens for forming a non-inverted, non-magnified image of the document. A circuit board 4 carrying a plurality of image sensor chips A is mounted at the bottom of the case 50 with the image sensor chips A positioned right below the lens 54.

With the image reader B described above, the light from the light source 53 reaches the image reading area 52 to irradiate the surface of the document 59. Then, the light reflected from the document is focused at the light receiving surface 20 of each image sensor chip A for serial output of an image signal with an output level corresponding to the amount of light received at the respective light receiving surface 20.

As previously described, the use of the above-described image sensor chips A in the image reader B can avoid using too many image sensor chips A. Accordingly, the length of the circuit board 4 can be shortened while also realizing the size reduction of other components such as the lens 54, the case 50 and soon. Consequently, the image reader B may be downsized, and the manufacturing cost may be reduced.

Every 8 signals of the image signals from the light receiving elements grouped together for level correction or output level adjustment. On the other hand, the number N of the image reading picture elements in each image sensor chip A is, for example, 152 or 104 which is an integer multiple of 8. Therefore, the level correction can be performed appropriately for each image sensor chip A on a chip-by-chip basis. More specifically, when the number N of the image reading picture elements is 152, the 152 image signals from the single image sensor chip A are divided exactly into 19 groups, so that there is no need for performing the correction process over two image sensor chips. If, for example, the image signals outputted separately from the two image sensor chips A are grouped together for level correction, manufacturing fluctuations between the two image sensor chips and/or a difference in position relative to the lens 54 may result in inappropriate level correction. Therefore, the level correction of the image signals should be preferably performed within every image sensor chip. The above-described design meets such a requirement appropriately.

The specific design of the image sensor chip and the image reading apparatus according to the present invention should not be limited to the above-described embodiment but may be modified variously.

For instance, in accordance with the present invention, the specific values for γ, n and p may differ from those previously described.

Further, the resolution γ and the minimum difference p between the required different reading widths need not be expressed in inches. According to the present invention, when the required reading widths changes at an interval of 50 mm like 100 mm, 150 mm and 200 mm, this length of 50 mm may be used as an unit length for the resolution γ and the minimum difference p. In this case, the number of the image reading picture elements per 50 mm may be used as the resolution γ, and if the minimum difference p between the required reading widths is 50 mm, this minimum difference p may treated as a unity.

Since the number of the image reading picture elements in a conventional image sensor chip is an integer multiple of 16, the number N of the image reading picture elements according to the present invention excludes multiples of 16.

I claim:

1. An image sensor chip comprising:
   a plurality of light receiving elements for photoelectric conversion, the plurality of light receiving elements having light receiving surfaces serving as a plurality of image reading picture elements, the plurality of image reading picture elements being arranged in a row at a constant pitch on the chip;
   wherein the number N of the image reading picture elements is defined as N=n·k (other than an integer multiple of 16);
   wherein n represents the number of image signals processed as a group when the image signals from the light receiving elements are subjected to level correction on a group-by-group basis;
   wherein k is a minimum integer satisfying $0<(n·k−γ·p)<n$;

wherein γ is a resolution defined as the number of image reading picture elements per predetermined unit length; and wherein p is a minimum difference between required reading widths as calculated on the basis of said unit length.

2. The image sensor chip according to claim 1, wherein the chip comprises a semiconductor chip which has a rectangular shape elongated in a direction, the plurality of light receiving elements being built in the chip as arranged in said direction.

3. The image sensor chip according to claim 2, further comprising a built-in circuit for operating the plurality of light receiving elements.

4. The image sensor chip according to claim 1, wherein n is 8, γ being 11.8 dots/mm, the number N of the reading picture elements being 152.

5. The image sensor chip according to claim 1, wherein n is 8, γ being 8 dots/mm, the number N of the image reading picture elements being 104.

6. An image reading apparatus comprising:

a plurality of image sensor chips carrying a plurality of light receiving elements for photoelectric conversion, the plurality of light receiving elements having light receiving surfaces serving as a plurality of image reading picture elements, the plurality of image reading picture elements being arranged in a row at a constant pitch on the chip;

a substrate carrying thereon the plurality of image sensor chips arranged in an array;

a light source for irradiating a reading line area of a document image with light;

a lens for focusing the light, which is irradiated by the light source and reflected from the document, at the plurality of image reading picture elements;

wherein the number N of the image reading picture elements is defined as $N = n \cdot k$ (other than an integer multiple of 16);

wherein n represents the number of image signals processed as a group when the image signals from the light receiving elements are subjected to level correction on a group-by-group basis;

wherein k is a minimum integer satisfying =b $0 < (n \cdot k - \gamma \cdot p) < n$;

wherein γ is a resolution defined as the number of image reading picture elements per predetermined unit length;

wherein p is a minimum difference between required reading widths as calculated on the basis of said unit length.

* * * * *